United States Patent

Ipbach

[15] 3,641,752
[45] Feb. 15, 1972

[54] GRASS-CUTTING APPARATUS

[72] Inventor: Henry E. Ipbach, 55 Foxen Road, East Haven, Conn. 06512

[22] Filed: Dec. 14, 1970

[21] Appl. No.: 97,664

[52] U.S. Cl. ................................................ 56/291, 56/244
[51] Int. Cl. ......................................................A01d 55/24
[58] Field of Search....................56/290, 291, 292, 244, 245, 56/154, 15.4, 13.6, 12.7

[56] References Cited

UNITED STATES PATENTS

| 1,760,939 | 6/1930 | Emerson | 56/290 |
| 2,543,386 | 2/1951 | Templeton | 56/154 |
| 2,957,294 | 10/1960 | Hallenbeck | 56/15.4 |
| 3,488,931 | 1/1970 | Matthews | 56/12.7 |
| 3,152,431 | 10/1964 | Ott et al. | 56/13.6 |

*Primary Examiner*—Russell R. Kinsey
*Attorney*—McCormick, Paulding & Huber

[57] ABSTRACT

A plurality of circular cutters are mounted in spaced relationship on a chain, which chain is entrained on sprockets rotatably mounted in a frame. These cutters travel in a closed path adjacent the peripheral edge of a bottom plate, which edge has a plurality of teeth. Each cutter is mounted on a bracket fixed to the chain so as to be capable of rotation on its support shaft, or axle. Springs bias the cutters against the teeth-defining peripheral portion of the bottom plate so that the circumferential lower edge of each cutter is adapted to cut grass in the slots defined between the teeth. Each cutter tends to rotate slowly as it travels over the bottom plate due to frictional forces between it and the bottom plate thereby presenting a continuously varying segment of its cutting edge to the grass, and also providing thereby a continuous self-sharpening cutting action.

6 Claims, 2 Drawing Figures

PATENTED FEB 15 1972

3,641,752

Inventor
Henry E. Ipbach

McCormick, Paulding & Huber
Attorneys

GRASS-CUTTING APPARATUS

SUMMARY OF INVENTION

This invention relates to grass-cutting apparatus, and deals more particularly with a chain having a plurality of cutters which cooperate with a fixed plate to achieve the grass-cutting action.

A horizontally extending bottom plate is supported in a frame which may be mounted on wheels or the like, and said plate has a plurality of outwardly projecting teeth or fingers between each adjacent pair of which teeth an inwardly extending slot is defined. A chain is entrained over sprockets provided in the frame for movement around a closed path adjacent to the peripheral edge of the bottom plate. A plurality of circular cutters are rotatably supported on the chain by means of brackets so that a segment of the lower circumferential edge of each cutter travels across the teeth-defining portion of the plate.

The general object of the present invention is to provide a grass-cutting apparatus which utilizes an endless chain to carry a plurality of self-sharpening cutters around a closed path located just inside of the peripheral edge of a fixed plate having slots to define teeth, in conjunction with which the teeth cutters cooperate to cut the grass. This construction provides a relatively safe grass-cutting apparatus which does not suffer from the safety hazards of the conventional rotary-type lawnmower. The cutters are individually mounted to the chain so as to be self-sharpening in operation as they travel around a closed path defined by the chain.

DETAILED DESCRIPTION

Figure 1:
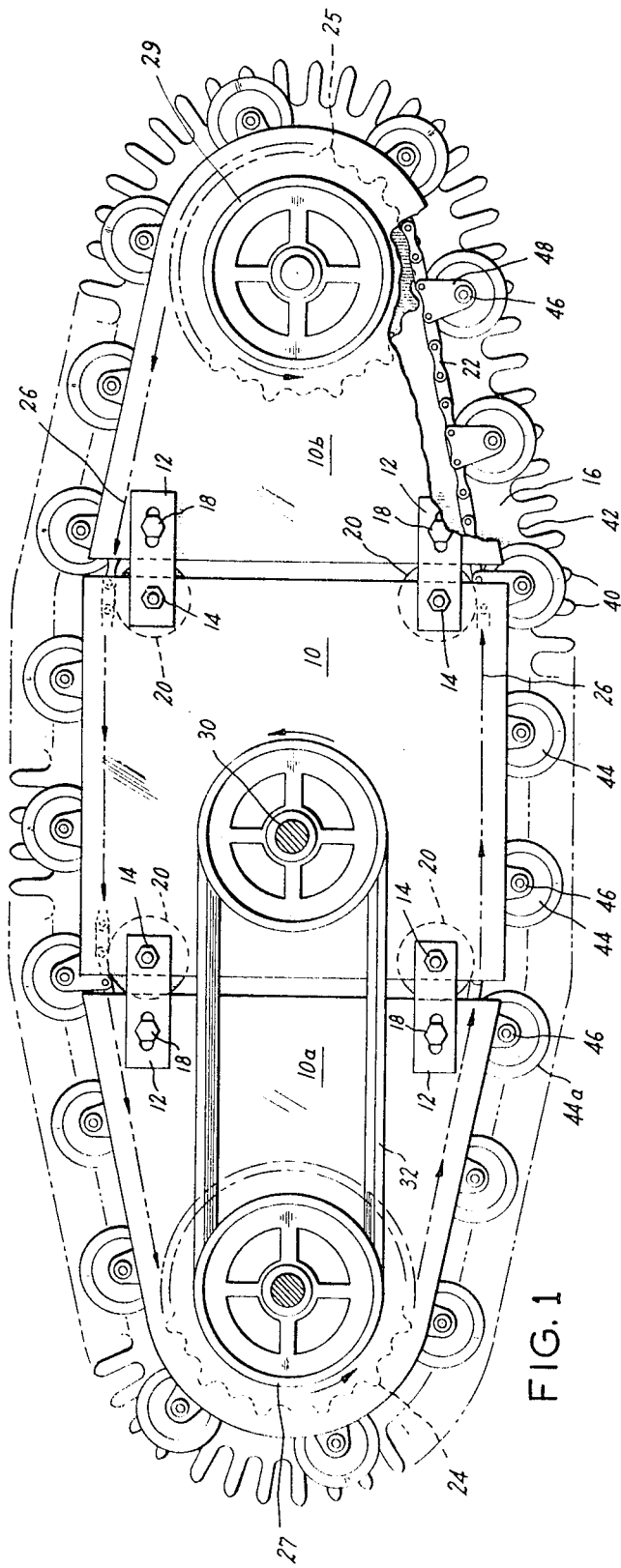
FIG. 1 is a plan view with portions broken away to reveal the relationship between the cutters and the chain in an apparatus constructed in accordance with the present invention.

Turning now to the drawings in greater detail, FIG. 1 shows a grass-cutting apparatus constructed in accordance with the present invention in a presently preferred form. A frame 10 includes a center portion which is generally square or rectangular in shape, and also includes left- and right-hand portions 10a and 10b adjustably connected to the center portion 10 by means of outwardly extending brackets 12 bolted to the center frame portion 10, as indicated generally by the screws 14. These screws 14 extend downwardly through the bracket 12 and through the center frame portion 10, and carry at their lower ends a bottom plate 16 to be described. The upper ends of the screws 14 support the outwardly extending brackets 12 each of which brackets includes a slotted opening for adjustably receiving a second screw 18, which screw is adapted to adjustably mount the left- and right-hand frame portion 10a and 10b to the center frame portion 10 in the desired relationship. The screws 14 preferably carry small idler sprockets 20 around which a chain 22 is entrained.

It will be apparent that the frame 10, or its left- and right-hand portions 10a and 10b, might carry suitable rollers or wheels to aid in moving the apparatus over the lawn to be cut. These conventional components are omitted for clarity, however, and from the description to follow it will be apparent that the apparatus of the present invention might be used either as a single self-contained unit by the home owner, or that it might be adapted for commercial use by providing several such devices in an installation adapted to be drawn by a single tractor or the like.

The left- and right-hand frame portions 10a and 10b each carry a sprocket, 24 and 25 respectively, and these sprockets, 24 and 25, in conjunction with the idler sprockets 20 confine the chain 22 to the path of travel indicated generally by the series of arrows shown at 26 in FIG. 1. Either of the sprockets 24 or 25 might be driven by suitable means but in the embodiment shown each of these sprockets includes an associated drive pulley 27 and 29 respectively, so that a plurality of these devices in FIG. 1 can be ganged together for use in cutting a swath wider in extent than the total width of the apparatus shown and limited only by the number of units which might be combined in a particular installation. In the conventional self-contained lawnmower of the type used by the homeowner a center drive shaft 30 might be driven by a small gasoline engine or electric motor so as to operate the left-hand drive sprocket 24 through an intermediate belt 32 as shown in FIG. 1.

As best shown in the lower right-hand portion of FIG. 1 the chain 22 is of conventional construction, being continuously driven in the direction of the arrows 26 by the means described above, and as shown in this view the bottom plate 16 can be seen to be generally coextensive in size and extent with the overall frame defined by the portions 10, 10a and 10b and the plate 16. The bottom plate 16 preferably includes outwardly extending fingers or teeth 40 which teeth define slots or inwardly extending openings 42 between each adjacent pair of teeth or fingers. The path of travel of the chain 22 is preferably located adjacent to and somewhat inside of the inner ends of the slots so that cutters 44 carried by the chain will travel across and above the teeth-defining portion of the bottom plate 16 in the manner to be described.

As shown, the cutters 44 are mounted in spaced relationship along the entire length of the chain 22 and each cutter is circular in configuration as viewed in FIG. 1, so that an outer segment or portion of each cutter travels successively across each of the teeth or fingers and across each of the associated slots defined therebetween. More particularly, it will be apparent from FIG. 1 that the path of the midpoint of each of the circular cutters is located in closely spaced relationship to the inner ends of the slots 42 in the bottom plate 16 so that as the cutter travels in the direction indicated it will exhibit a tendency to rotate on its support axle 46 as a result of the difference in frictional force exerted between it and the adjacent bottom plate as between the inside and outside half-segments of these circular cutters.

Figure 2:
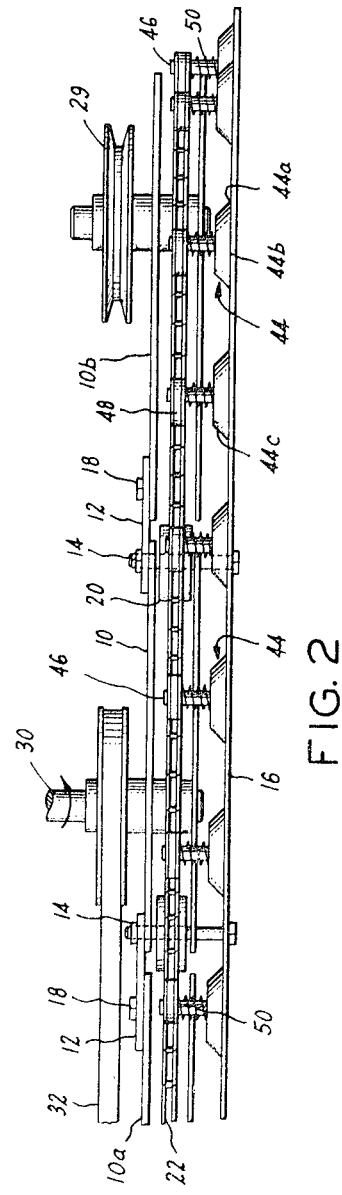
FIG. 2 is an elevational side view of a portion of the apparatus shown in FIG. 1.

Turning now to a more complete description of the means for mounting the cutters 44 to the chain 22 said means preferably comprises an outwardly extending bracket 48 connected at its inner end to two rollers of the conventional roller chain 22 and carrying at its outer end the support axle 46 for each associated cutter 44. As best shown in FIG. 2, each cutter comprises a circular element having a vertical cross-sectional shape in the form of an isosceles trapezoid, that is having an outer circumferential side 44c which is inclined with respect to the vertical and to the horizontal lower face 44b of the cutter so as to define a lower circumferential cutting edge 44a. The cutting edge 44a is more particularly defined by the acute angle between the circumferentially extending inclined side 44 of the cutter and its lower face 44b. The support axle or shaft 46 associated with each of the cutters 44 is located in centered relationship with respect to the cutter and is supported at its upper end in the bracket 48 associated with the chain 22 as described above. Further, each of these support axles, or shafts 46 is adapted to support its associated cutter 44 at some distance below the bracket 48 so as to provide a space therebetween for a coil compression spring 50. The spring 50 provides a biasing means for urging the lower face 44b of the circular cutter 44 into engagement with the upper face of the support plate 16. It should be noted that each cutter 44 is not otherwise supported on its associated axle 46, and as so mounted each cutter 44 is free to move vertically except insofar as each cutter is urged downwardly by the spring 50. As so constructed and arranged each such cutter 44 will exhibit a tendency to rotate as it travels around the closed path dictated by the chain 22 so as to continuously present a varying segment of its periphery to the grass to be cut, and so as to continuously exhibit a tendency to sharpen both its own cutting edge 44a and the upper edges of the teeth slots defined by the fixed bottom plate 6.

I claim:

1. A grass-cutting device comprising a frame, a horizontal bottom plate supported from said frame and having a plurality of outwardly projecting horizontal fingers in its peripheral portion between each adjacent pair of which fingers an inwardly extending slot is defined, chain means supported in said frame for movement around a closed path so oriented that a major portion of said path is located adjacent the inner ends of said bottom plate slots, a plurality of cutters, means for rotatably supporting said cutters from spaced points on said chain means, said cutters having generally flat lower faces which engage the upper surface of said bottom plate in the area of said finger defining portion.

2. A grass-cutting device as set forth in claim 1 wherein each of said cutters is circular in shape and travels around a closed path defined by the path of said chain means, said cutter path being so oriented with respect to said finger defining portion of said bottom plate that an outer segment of each cutter travels successively across each of said fingers and each of said slots.

3. A grass-cutting device as set forth in claim 2 wherein each of said cutters has an axially inclined circumferential side which cooperates with the lower face of said cutter to define a lower cutting edge, said cutting edge having an active segment which varies with respect to the plate as the cutter travels across each of said fingers and slots in a self-sharpening cutting action.

4. A grass-cutting device as set forth in claim 3 wherein said means for rotatably supporting said cutters from said chain means comprises an outwardly extending bracket, the inner end of which is carried by said chain means, a vertically oriented shaft mounted at the outer end of each bracket to rotatably support one of said cutters.

5. A grass-cutting device as set forth in claim 4 wherein said cutter-supporting means further includes biasing means for urging each cutter downwardly against said bottom plate.

6. A grass-cutting device as set forth in claim 5 wherein said biasing means comprises a compression spring acting between the upper surface of said cutter and said cuttersupporting bracket, and spring being mounted on said cutter-supporting shaft.

* * * * *